(12) United States Patent
Wesson

(10) Patent No.: US 7,871,178 B1
(45) Date of Patent: Jan. 18, 2011

(54) LED PRODUCTS: FLASHING LED DISPLAY

(75) Inventor: Bruce Wesson, Newton, MS (US)

(73) Assignee: Jam Strait, Inc., Newton, MS (US)

( * ) Notice: Subject to any disclaimer, the term of this patent is extended or adjusted under 35 U.S.C. 154(b) by 385 days.

(21) Appl. No.: 12/047,950

(22) Filed: Mar. 13, 2008

Related U.S. Application Data

(62) Division of application No. 10/408,768, filed on Apr. 7, 2003, now abandoned.

(60) Provisional application No. 60/370,319, filed on Apr. 5, 2002.

(51) Int. Cl.
*F21L 4/00* (2006.01)

(52) U.S. Cl. .................. 362/191; 362/253; 362/396; 40/661.02

(58) Field of Classification Search .............. 362/125, 362/191, 253, 396, 432, 812; 40/564, 661.02
See application file for complete search history.

(56) References Cited

U.S. PATENT DOCUMENTS

| 4,305,117 | A | 12/1981 | Evans |
| 4,355,348 | A | 10/1982 | Williams |
| 4,675,575 | A | 6/1987 | Smith et al. |
| 5,065,290 | A * | 11/1991 | Makar et al. ................ 362/191 |
| 5,365,149 | A | 11/1994 | Blakeslee et al. |
| 5,695,346 | A | 12/1997 | Sekiguchi et al. |
| 5,816,696 | A * | 10/1998 | Beisler ....................... 362/396 |
| 5,848,837 | A | 12/1998 | Gustafson |
| 6,166,496 | A | 12/2000 | Lys et al. |
| 6,211,626 | B1 | 4/2001 | Lys et al. |
| 6,292,901 | B1 | 9/2001 | Lys et al. |
| 6,340,868 | B1 | 1/2002 | Lys et al. |

* cited by examiner

*Primary Examiner*—Stephen F Husar
(74) *Attorney, Agent, or Firm*—Garvey, Smith, Nehrbase & North, L.L.C.; Seth M. Nehrbass

(57) ABSTRACT

An eye grabber flashing LED store display adaptable to a standard store display peg is a flashing LED device to be used in stores to draw attention to the products the display is intended for. It uses an LED or LEDs, an electronic circuit, and an energy source such as batteries or solar panels or both. The invention is housed or secured by paper, polymer, composite, metal or other material and may optionally double as a sign displaying any means of graphics. The invention is adaptable to many store display methods including the standard peg display for carded products. The LED is preferably positioned either directly on the housing or at the tip of the peg the products hang on where it can be easily seen by anyone within the perimeter.

10 Claims, 23 Drawing Sheets

*Causes LED's to pulsate with music, increasing in brightness as the music gets louder.

V1 - 324 Op Amp or equivalent

U1 - LM317T, LM7805, LM7815
or other voltage regulator.

U1-2 324 Op Amp or equivalent

U1 324 OpAmp or equivalent.

U1-2  324 OpAmp or equivalent.

U1-4  324 OpAmp or equivalent.

U1 - 324 OpAmp or Equivalent

Potentiometer for manual adjustment. Use Photoresistor or equivalent Photo sensitive circuitry so LED brightness is increased for day light operation and decreased for night operation.

* Color changing LED's

*CLED - 5H7C or equivalent.

LED PRODUCTS: FLASHING LED DISPLAY

CROSS-REFERENCE TO RELATED APPLICATIONS

This application is a divisional of U.S. patent application Ser. No. 10/408,768 filed 7 Apr. 2003, now abandoned which was published as US Published Patent Application US2004-0085781 A1 on 6 May 2004 and is incorporated herein by reference.

My U.S. Provisional Patent Application Ser. No. 60/370,319, filed 5 Apr. 2002, is incorporated herein by reference. Priority of that application is claimed.

My co-pending U.S. patent application Ser. No. 09/578,813, filed 24 May 2000, is incorporated herein by reference.

My U.S. Provisional Patent Application Ser. No. 60/135,797, filed 24 May 1999, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to direct current light-emitting diodes (LEDs) and more particularly to LEDs for attracting attention.

2. Background

Incorporated herein by reference are U.S. Pat. Nos. 5,065,290 and 5,816,696.

Also incorporated herein by reference are the following U.S. Pat. Nos.

| PAT. NO. | Title |
| --- | --- |
| 6,340,868 | Illumination components |
| 6,292,901 | Power/data protocol |
| 6,211,626 | Illumination components |
| 6,166,496 | Lighting entertainment system |
| 5,848,837 | Integrally formed linear light strip with light emitting diodes |
| 5,695,346 | Process and display with moveable images |
| 4,675,575 | Light-emitting diode assemblies and systems therefore. |
| 5,365,149 | |
| 4,355,348 | |
| 4,305,117 | |

U.S. Pat. No. 4,193,651 discloses a short length of malleable, insulated metal conductor bearing a spark plug terminal connector at one end and, at the opposite end, a connector for attachment to a major length of the conventional, flexible, non-self-supporting ignition wire. The short length is of a self-supporting construction, typically of a solid core, heavy gauge metal wire that will retain a shape imparted to the conductor whereby the conductor can be bent into a form which spaces the conductor a safe distance from hot surfaces such as the exhaust manifold and from the other ignition wires.

SUMMARY OF THE INVENTION

It is an object of the present invention to provide a flashing LED display, particularly suitable for in-store displays (especially for selling light bulbs comprising LEDs) and decorative LEDs, primarily for autos and trucks, but which can also be used in other places.

The decorative LEDs for autos and trucks preferably include a single LED mounted on one end of a malleable wire (such as the conductor disclosed in U.S. Pat. No. 4,193,651) with a resistor between the LED and a source of power (such as an automobile battery). Preferably, the resistor is a standard axial lead resistor, and is preferably mounted near the LED; alternatively, the resistor could be solid state (such as a surface mounted resistor or chip resistor) and included in a control box, such that the LED is the only thing mounted on the malleable wire, and the LED is electrically connected to the control box.

The LED malleable wire lights of the present invention can preferably mount practically anywhere to add accentuating color and light to any 12 volt DC (though they can work at other voltages as well) application including under dashes, under seats, head liners, speakers, amps, console, wheel wells, under hood and just about anywhere one can imagine. Measuring typically ¼ inch round and ⅜ inch long, they snake into tight places not accessible by even the smallest of neon tubes, at typically a fraction of the cost.

Colors commercially available from Jam Strait Inc. are blue, red, white, green, amber, ultra-violet, and 7 color auto changing. One can connect them to interior lighting, running lights, head lights, a switch, or directly to power. All single color LEDs are preferably as bright as one will find anywhere, preferably with wide 25 to 30 degrees viewing angles (though LEDs with other viewing angles of e.g. about 1-180 degrees could also be used).

Lengths can be in, for example, 1' increments, from about 1' to about 24'. Colors can include blue, red, white, green, amber, ultra-violet, and 7 color auto changing (commercially available from China as CLED-5H7C or equivalent). Colors can include hyper red, hyper amber, hyper blue, hyper green, hyper white.

The LED, resistor, wire, and insulation are preferably formed in a small-diameter cylindrical shape about the size of the LED and are adapted to bend in various shapes. Typically one needs just 1 or 2 feet in length of malleable wire, and the rest can be stranded. The resistor value is preferably ¼ Watt, but could typically be about 1/16 Watt up to 1 Watt. Preferably axial lead resistors are used (but they could be surface mounted resistors or chip resistors).

The present invention can include the malleable LED light modules used in conjunction with various circuits, such as a circuit to cause pulsing of the LEDs based on music intensity (in such a case, the input could be a microphone 31 or a hard-wire audio input from the sound source).

Preferably, there are 13 different displays that the controller will drive (each with 10 outputs from controller). There can be, for example, 10 different segments (but could piggy back them to get 20 or 30 or more segments). In one display, there can be a mode where it just lights one at a time (dot mode), but when it hits number 10 all of them light up.

See also http://www.jamstrait.com/snake1.html.

The flashing display device of the present invention uses wires as conductors, applies to all display methods, is preferably self-contained, with all electronics, displays, and power source in a single unit. Preferably, the LED(s) are in a card toward the top, above the product on display and facing forward so as to be effective for its purpose. Preferably, the flashing display device of the present invention is printed as display sign and is made to retrofit existing store pegs.

Preferably, the flashing display device of the present invention will work with all types of pegs and other store displays.

Preferably, the flashing display device of the present invention does more than flash one LED Preferably, the flashing display device of the present invention installs with double back tape or glue to any display surface.

The flashing display device of the present invention is less expensive and more practical than similar prior art display devices.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DESCRIPTION OF THE PREFERRED EMBODIMENTS

Although specific embodiments of the present invention will now be described with reference to the drawings, it should be understood that such embodiments are by way of example only, and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Flashing LED Store Display Adaptable to Standard Store Display Peg

Figures 1A, 1B:
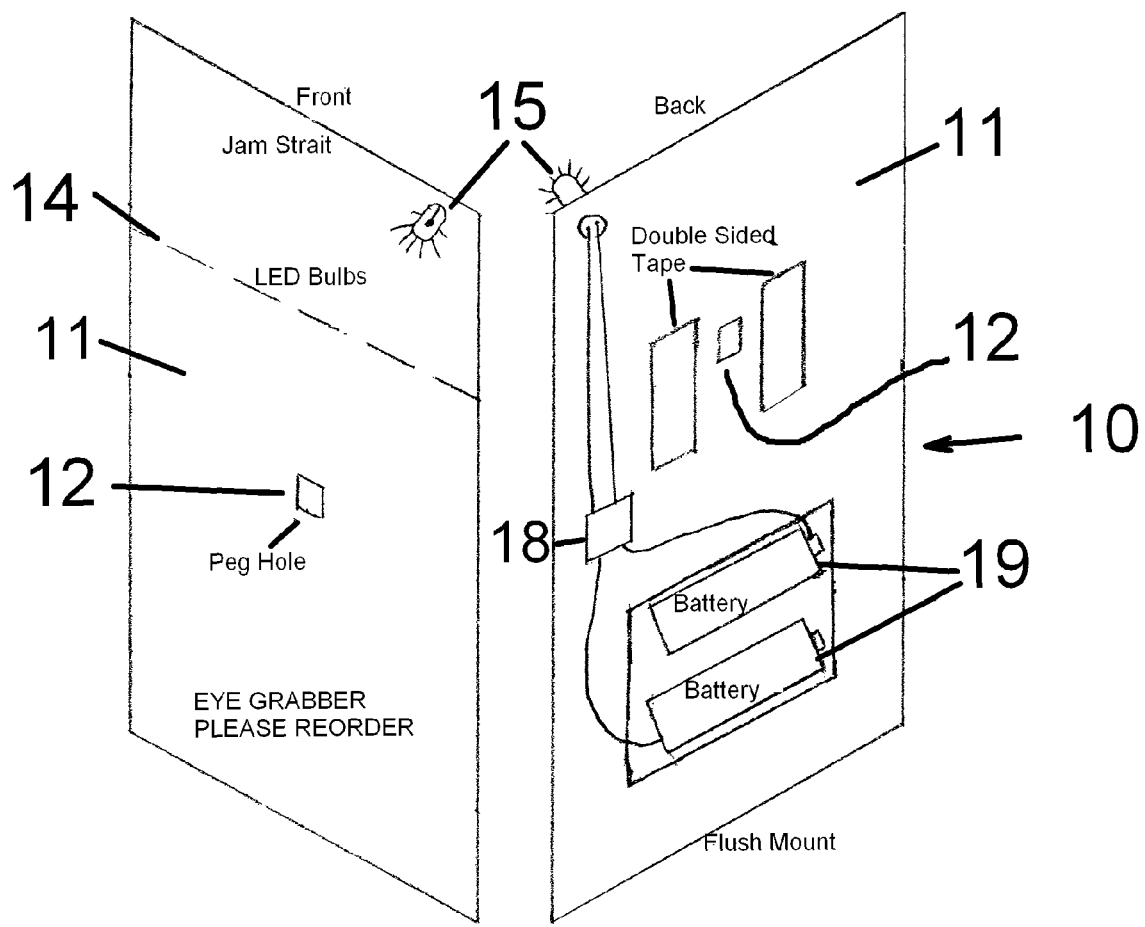
FIG. 1A is a perspective front view of a store display of the first embodiment of the present invention.
FIG. 1B is a perspective rear view of a first embodiment of the present invention.
Figure 2:
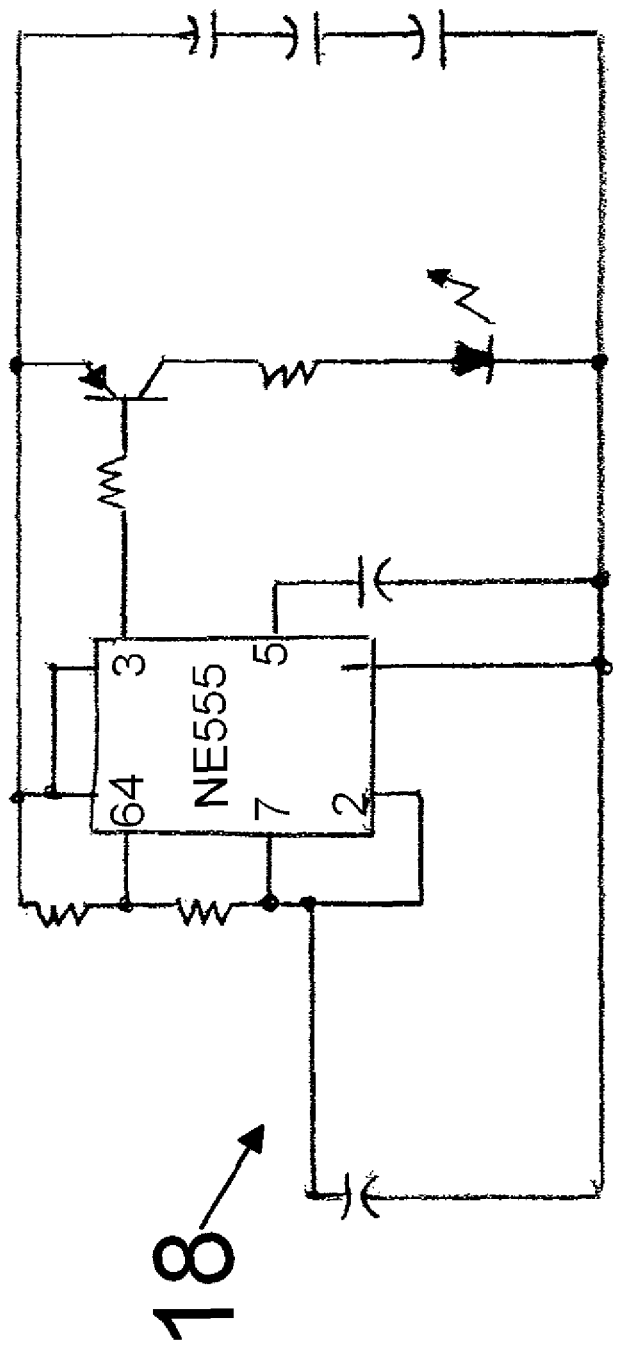
FIG. 2 is an LED pulse circuit for use with the store display of the first embodiment of the present invention.

The first embodiment of the present invention is a flashing LED device 10 used in stores to draw attention to the products for which the display is intended. It uses an LED 15 or LEDs, an electronic circuit 18, and an energy source such as batteries 19 or solar panels or both. The invention can be housed or secured by paper, polymer, composite, metal or other material and may optionally double as a sign displaying any means of graphics. The invention is adaptable to many store display methods including the standard peg display for carded products. The LED is preferably positioned directly on the housing 11 above the peg (see peg hole 12) on which the products hang, where it can be easily seen by anyone within the area (that is, anyone who is near enough to see the products on display). A dotted line 14 in FIG. 1A indicates the top level of the cards of the products displayed on the peg with which apparatus 10 is used.

Some features of the first embodiment of the present invention can preferably include: a flashing LED or LEDs (any color, brightness, style);
electronic circuitry either inside the LED or out;
electrical power source either AC, DC, battery, and/or solar;
housing or body of any material to hold circuit and/or to secure the above;
housing or body that doubles as a sign;
LED (any color, brightness, style, including color changing LED);
housing that adapts to standard store peg;
housing that adapts to standard store shelves;
housing that adapts to standard store endcaps;
housing that adapts to standard strip clips;
housing that adapts to standard store price and product description display bars;
housing that adapts to free-standing store displays;
housing that adapts to special store displays;
flashing LEDs that chase or alternately flash;

housing with store peg already built in; and/or housing with LED mounted within.

Led Malleable Wire Light Device and Means of Controlling Lighting Effects

The second embodiment of the present invention is a lighting device 20 designed to provide white and/or colored illumination and lighting effects in and on various structures and machinery including tight places to reach. The malleable wire light 20 uses one or more LED's 21, a current limiting resistor 22 or resistors, lengths of wire 23, and insulation 24 to form a very small lamp suitable for routing through tight places with low clearance. The malleable wire light 20 is preferably waterproof for exterior or interior use. It is preferably adaptable for AC or DC operation. Typical applications are in the interior or on the exterior of automobiles. Another typical application is in a college dorm room. The malleable wire light will not only work anywhere neon lighting will work, but it will also fit and work where neon will not because of its extremely small size. The malleable wire light is vibration-resistant and virtually indestructible by direct blow of rock whereas neon is relatively fragile. The malleable wire light is more energy efficient and is cooler operating compared to neon. Multiple malleable wire lights can be controlled by circuitry to strobe, flash, chase, respond to music, change colors, and random flash to provide dazzling lighting effects.

Figure 3:
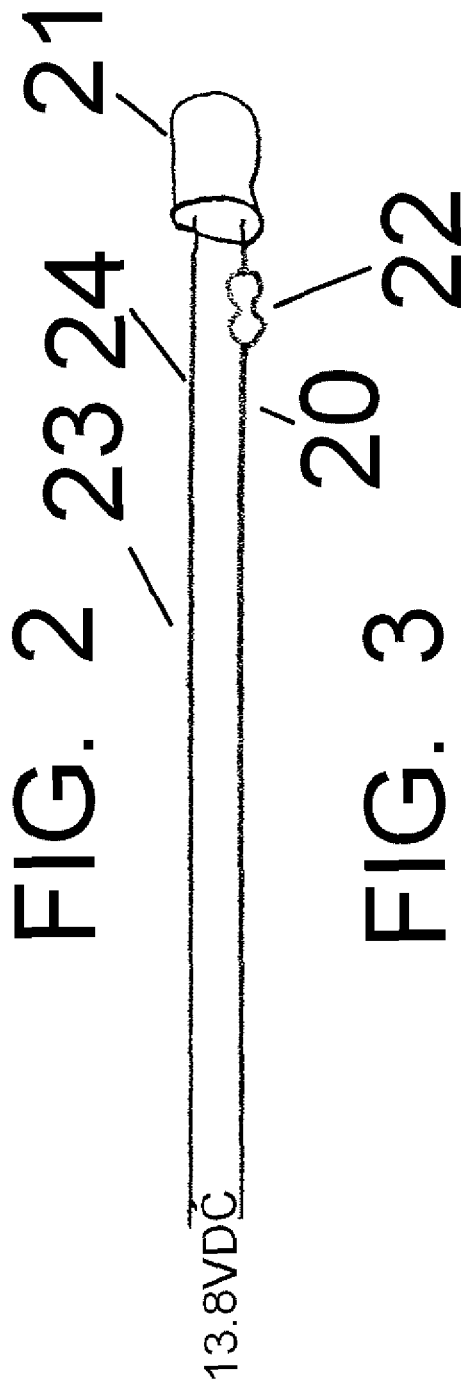
FIG. 3 shows a second embodiment of the present invention, a malleable LED light.
Figure 4:
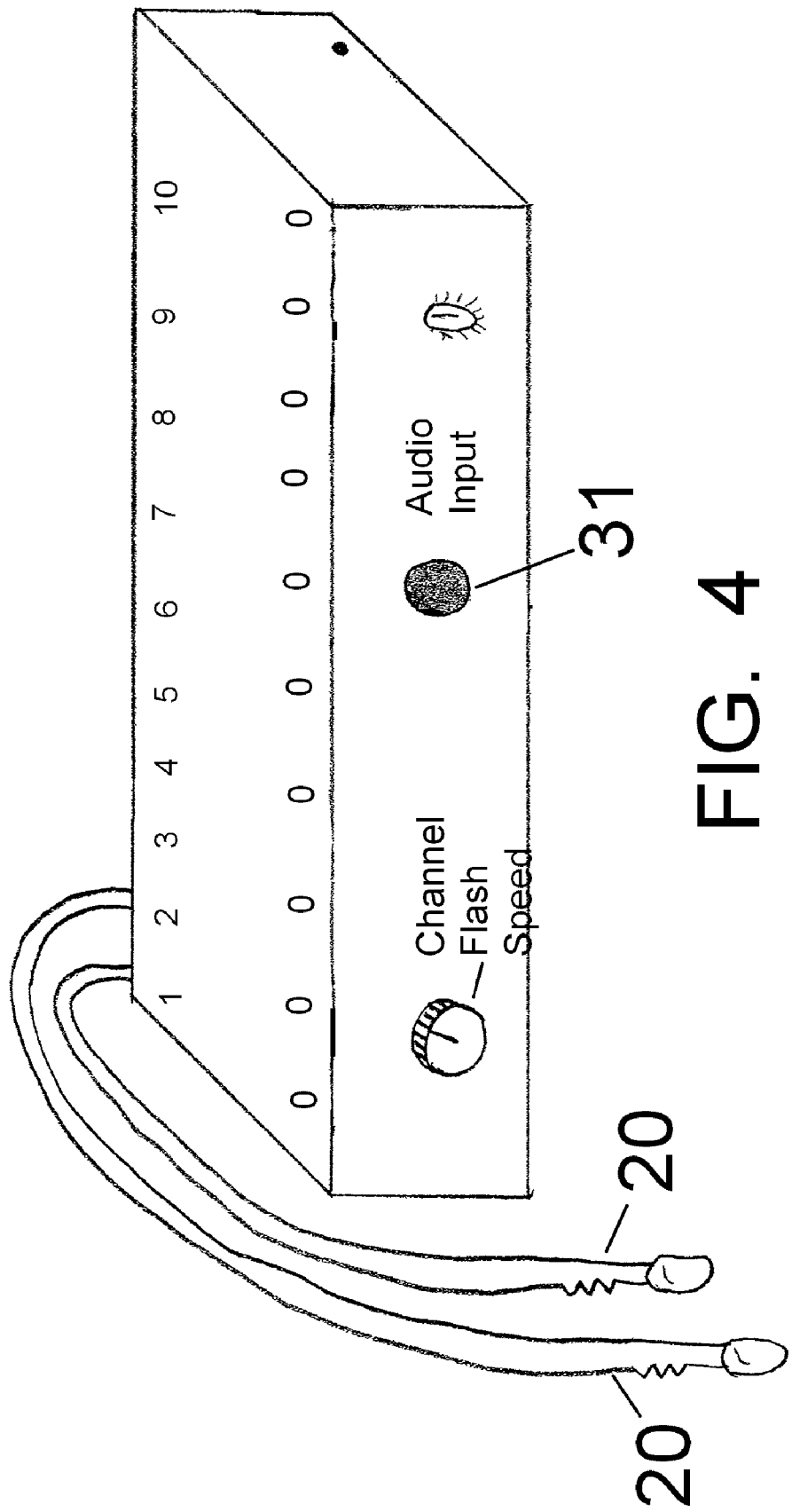
FIG. 4 shows an LED control housing.
Figure 5:
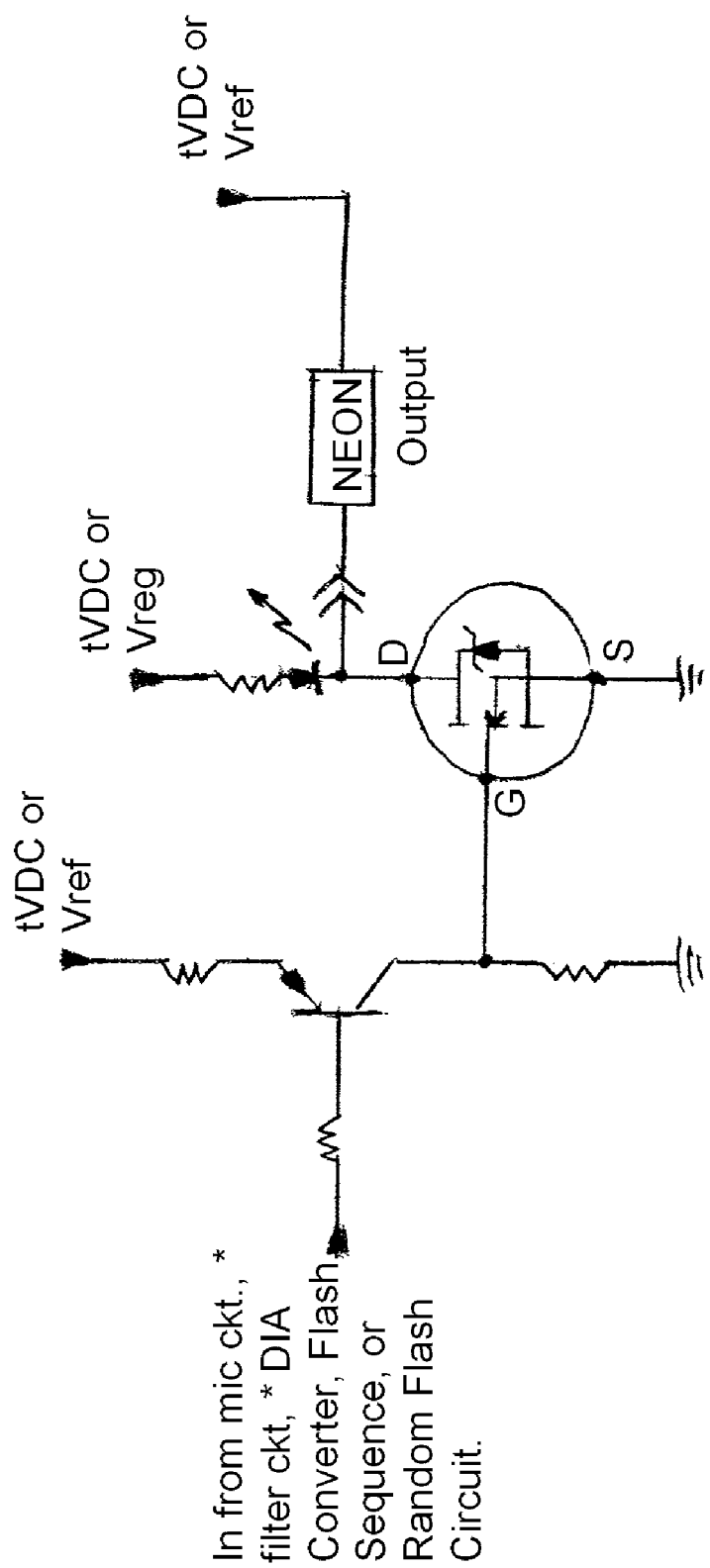
FIG. 5 shows a neon driver adapted to LED control circuit.
Figure 7:
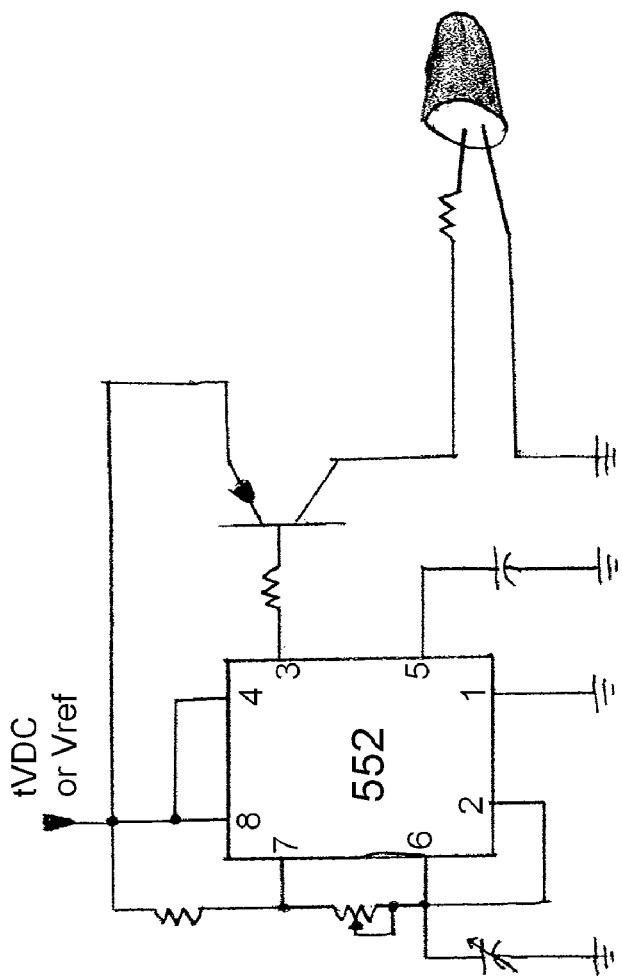
FIG. 7 is an LED flash circuit for malleable LED lights of the present invention.
Figure 6:
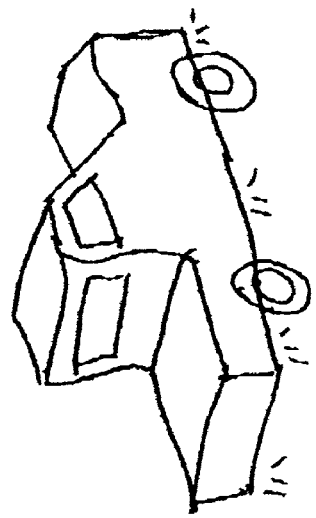
FIG. 6 shows a truck having the malleable LED lights of the present invention thereon.
Figure 8:
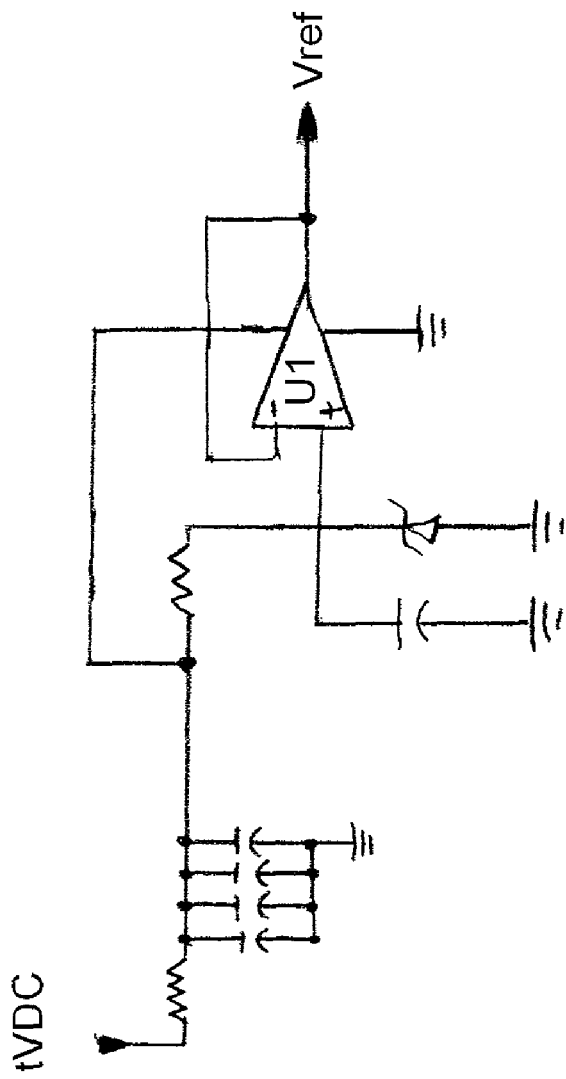
FIG. 8 is an optional filtered reference voltage circuit for malleable LED lights of the present invention.
Figure 9:
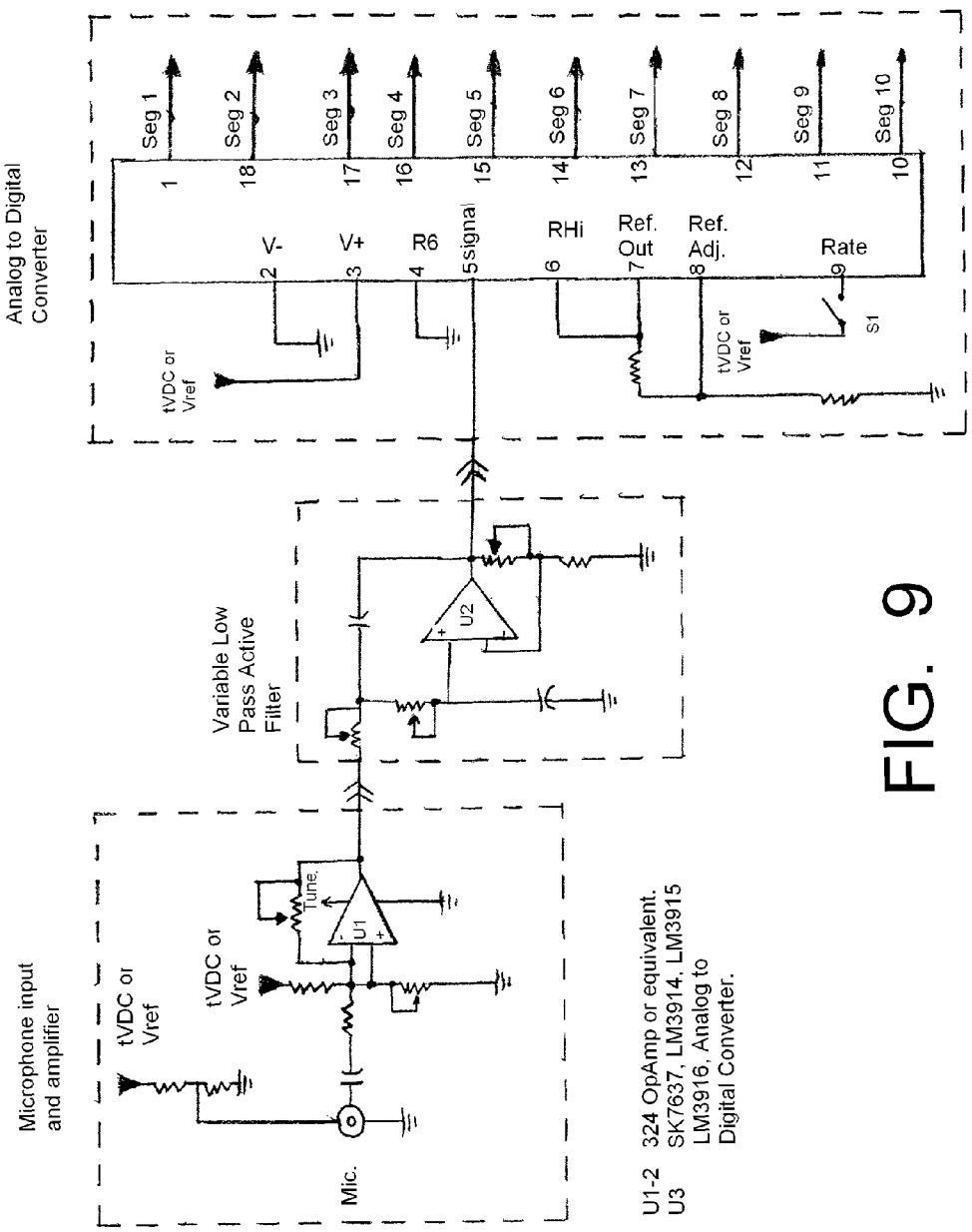
FIG. 9 is a circuit for malleable LED lights of the present invention.
Figure 10:
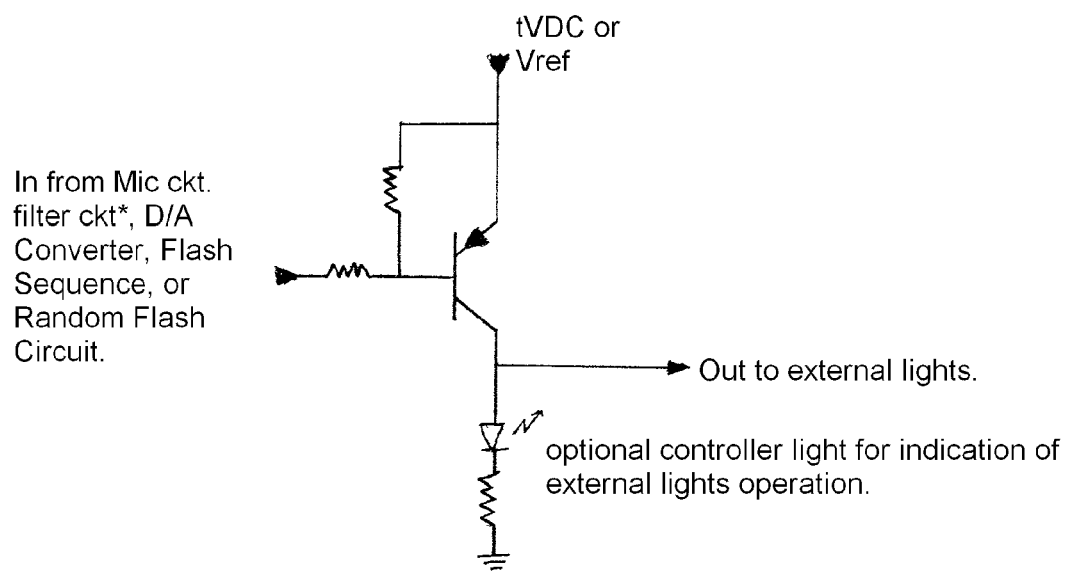
FIG. 10 is an LED control circuit with music pulse/PNP driver for malleable LED lights of the present invention.
Figure 11:
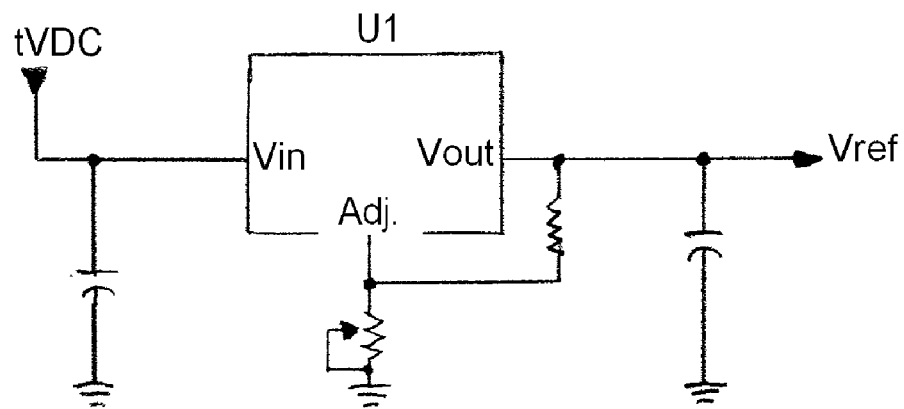
FIG. 11 is an LED control circuit with an optional regulated reference voltage circuit for malleable LED lights of the present invention.
Figure 12:
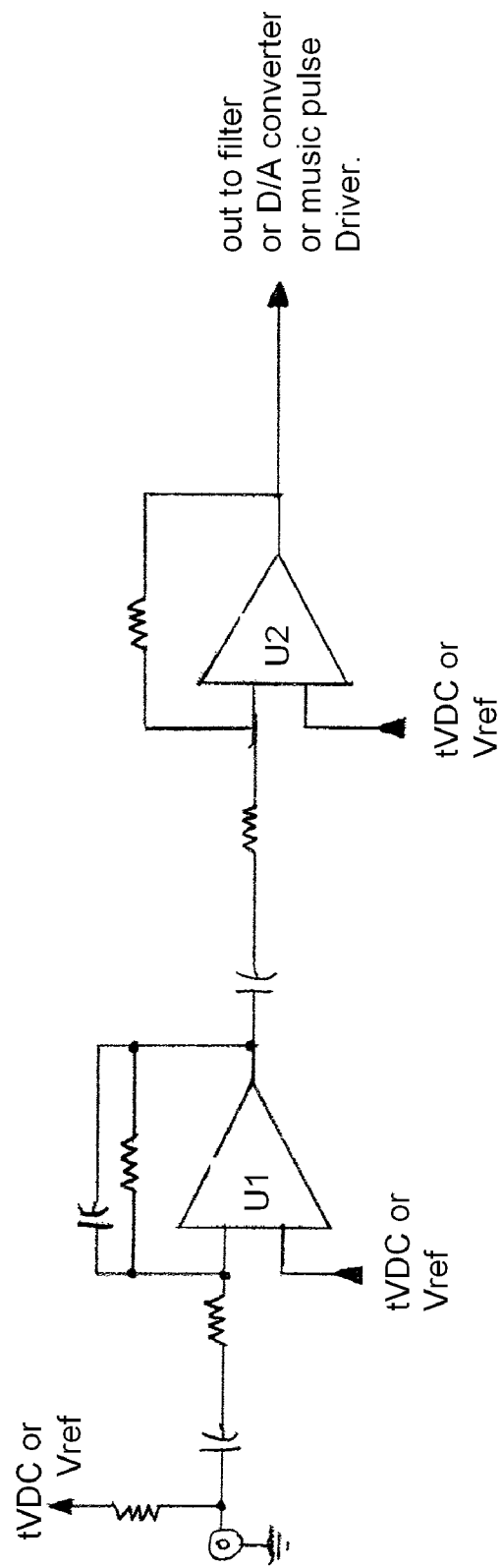
FIG. 12 is a music pulse and amplitude sequencer circuit with an alternate microphone and amplifier circuit for malleable LED lights of the present invention.
Figure 13:
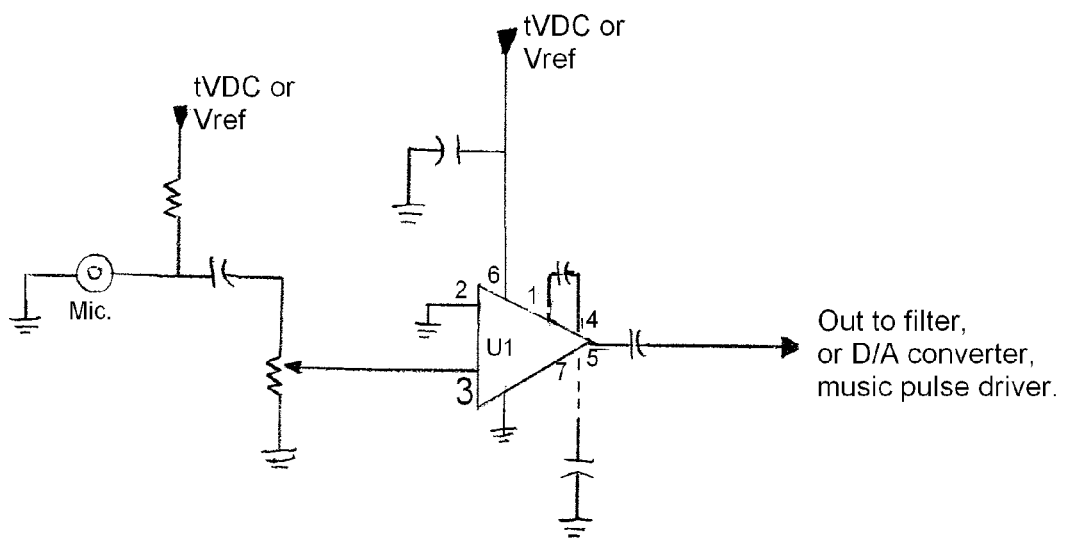
FIG. 13 is an LED control circuit with an optional microphone and amplifier circuit for malleable LED lights of the present invention.
Figure 14:
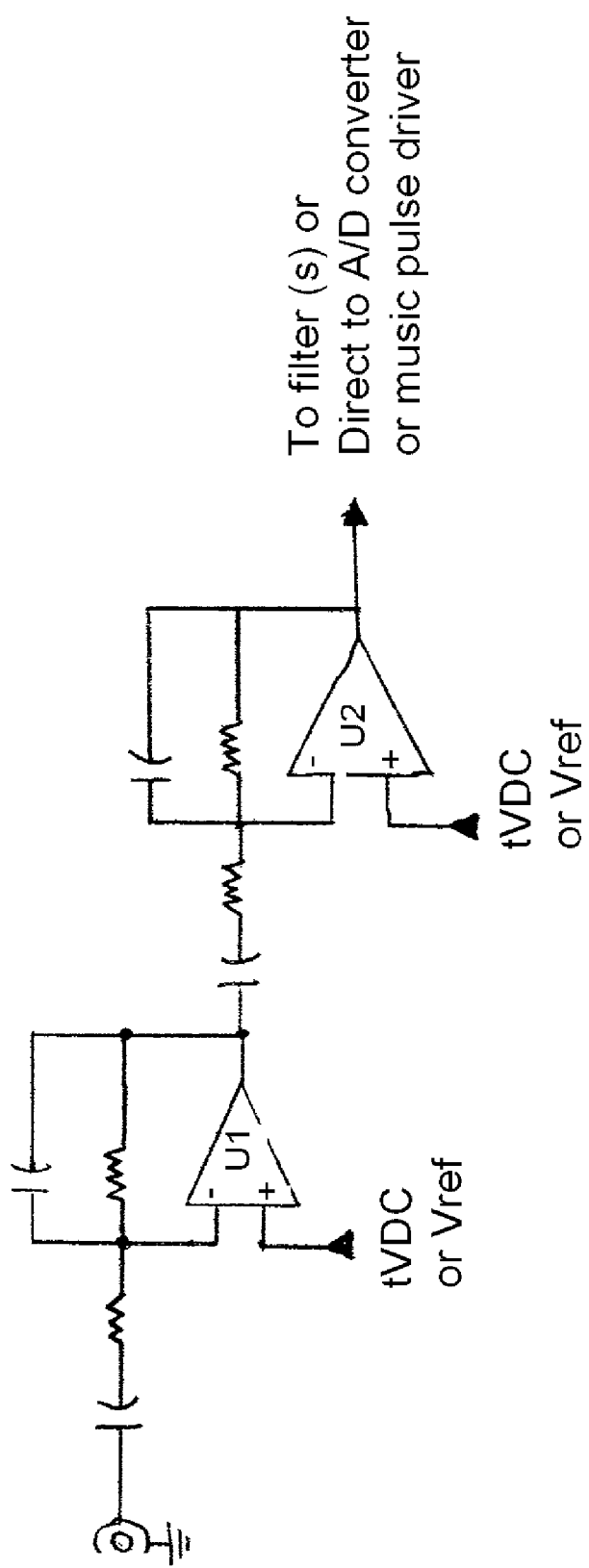
FIG. 14 is an LED control circuit with music pulse and amplitude sequencer circuit with one embodiment of a microphone and amp circuit for malleable LED lights of the present invention.
Figure 15:
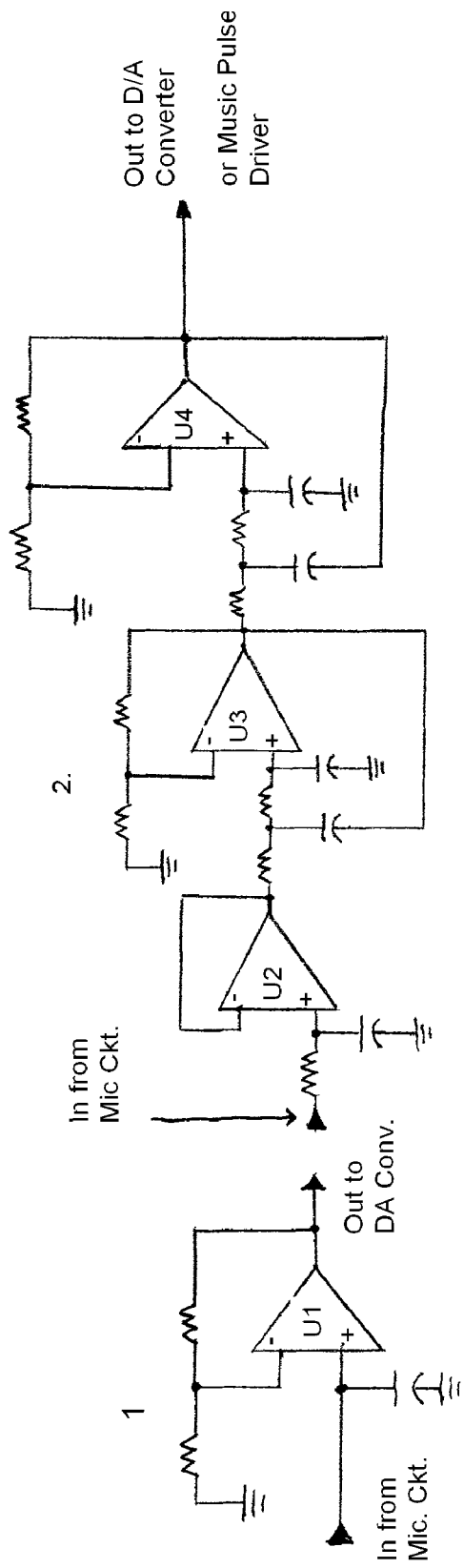
FIG. 15 is a music pulse and amplitude sequencer circuit with alternate low pass active filter circuits for malleable LED lights of the present invention.
Figure 16:
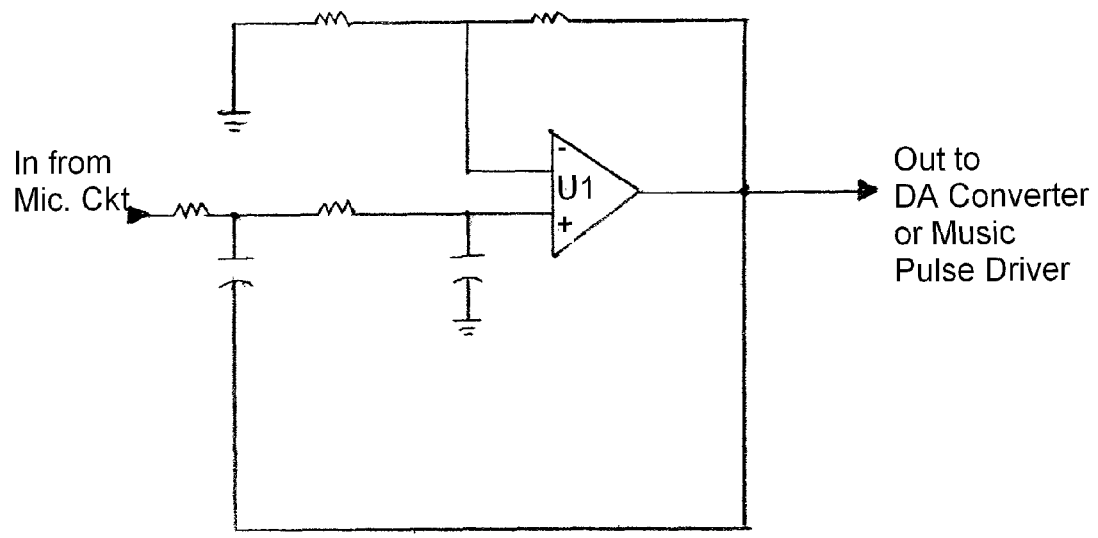
FIG. 16 is a music pulse and amplitude sequencer circuit with alternate low pass active filter circuits for malleable LED lights of the present invention.
Figure 17:
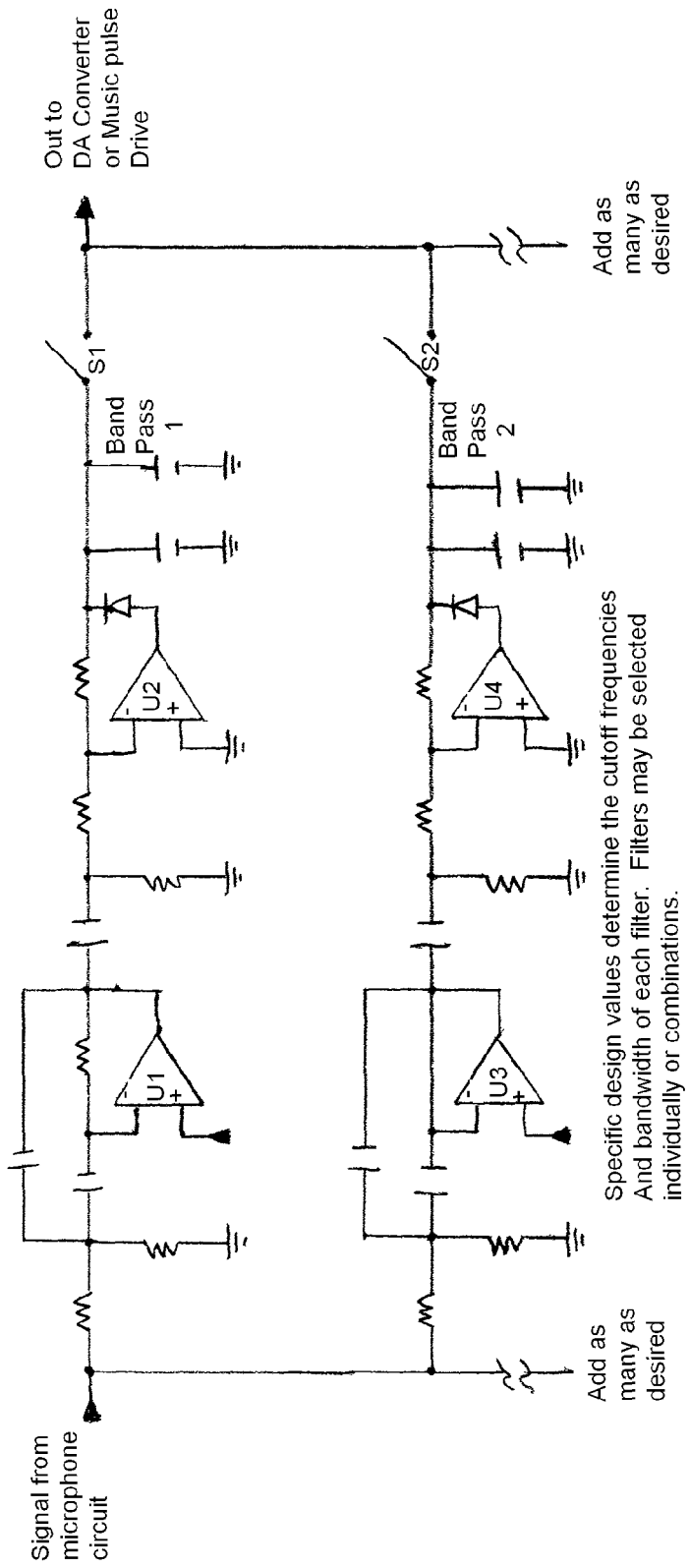
FIG. 17 is a music pulse and amplitude sequencer circuit with optional active band pass filter circuits for malleable LED lights of the present invention.
Figure 18:
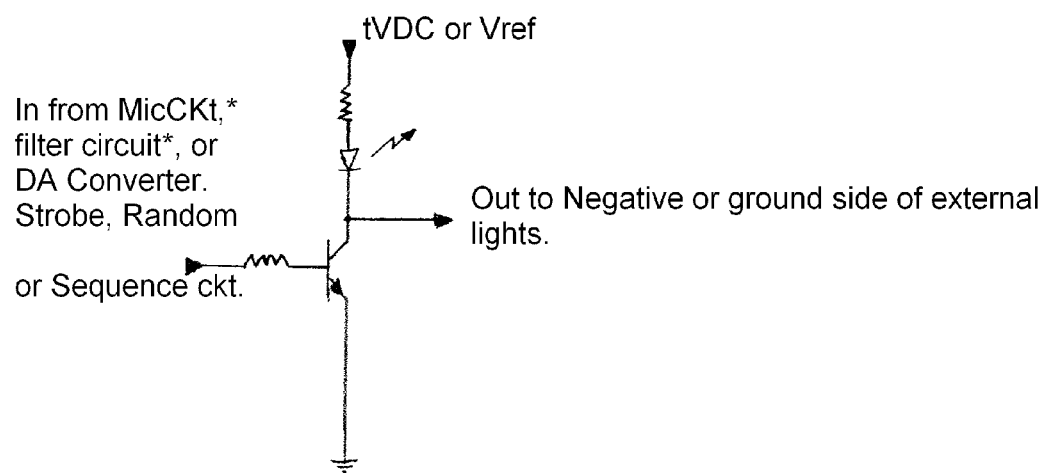
FIG. 18 is an LED control circuit with music pulse/PNP driver for malleable LED lights of the present invention.
Figure 19:
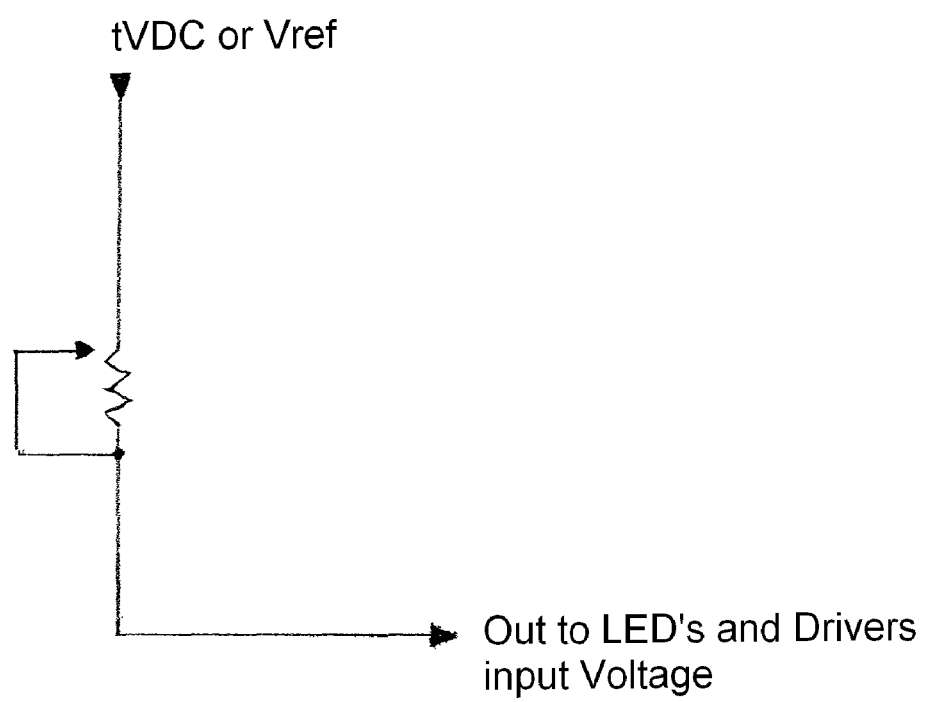
FIG. 19 is an LED control circuit with a manual variable brightness circuit for malleable LED lights of the present invention.
Figure 20:
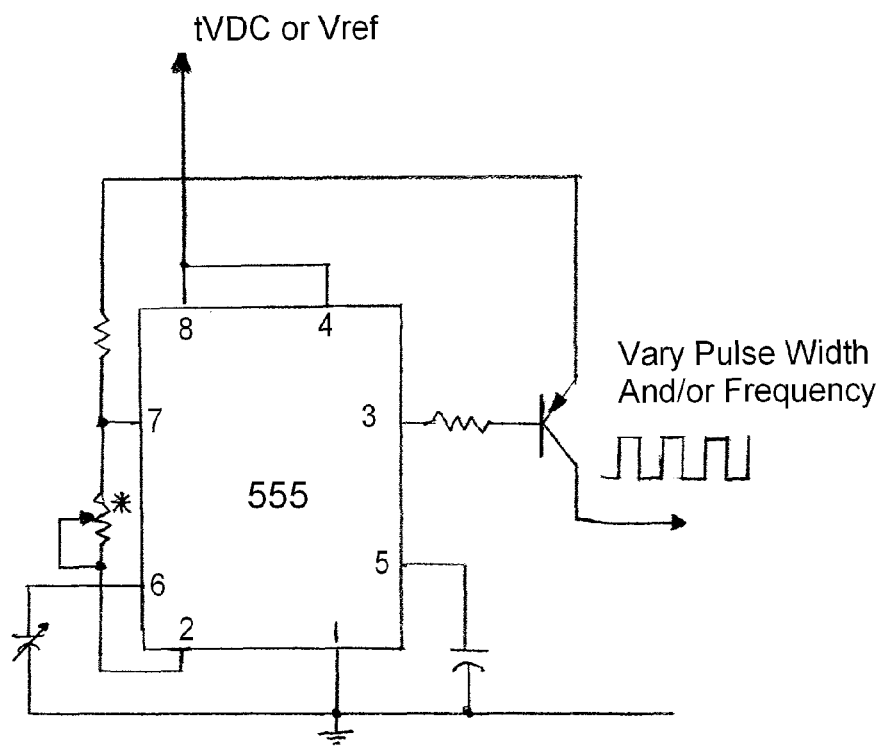
FIG. 20 is an LED control circuit with a manual and automatic variable brightness circuit for malleable LED lights of the present invention.
Figure 21:
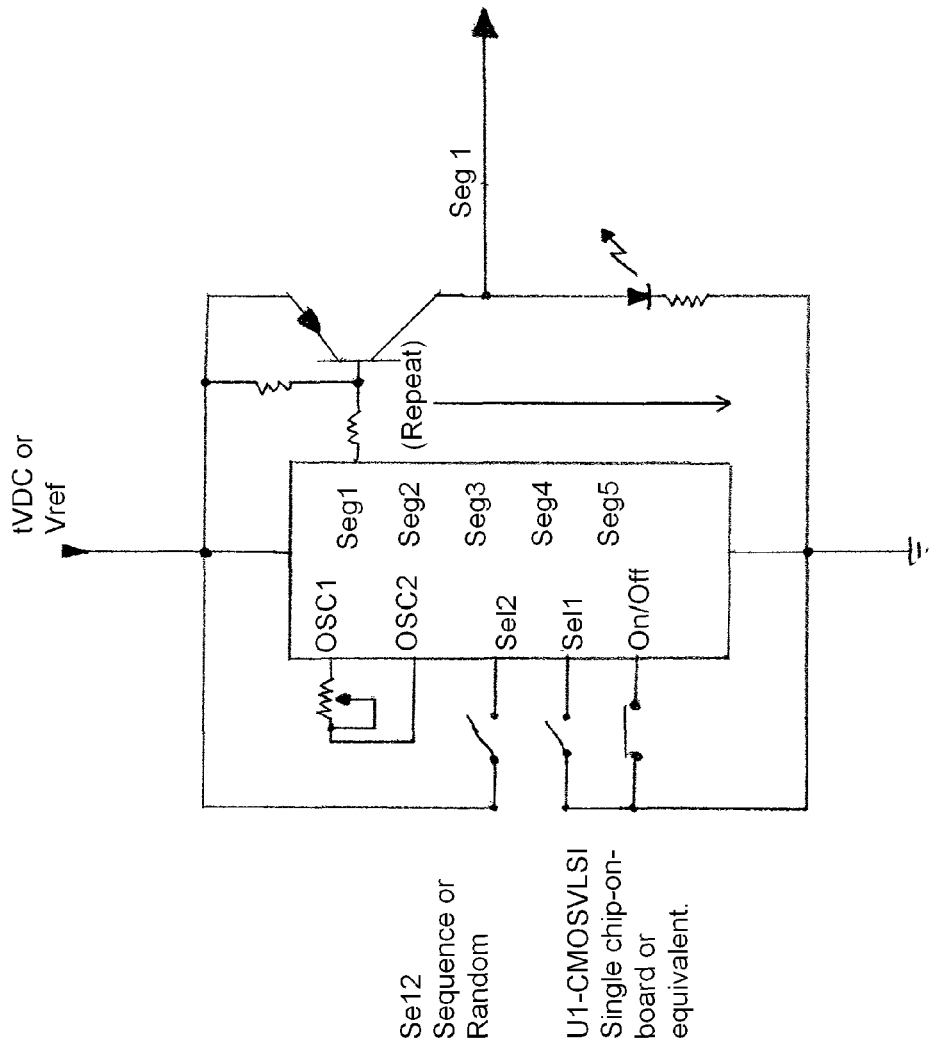
FIG. 21 is an LED control circuit with a random/sequence light flasher circuit for malleable LED lights of the present invention.
Figure 22:
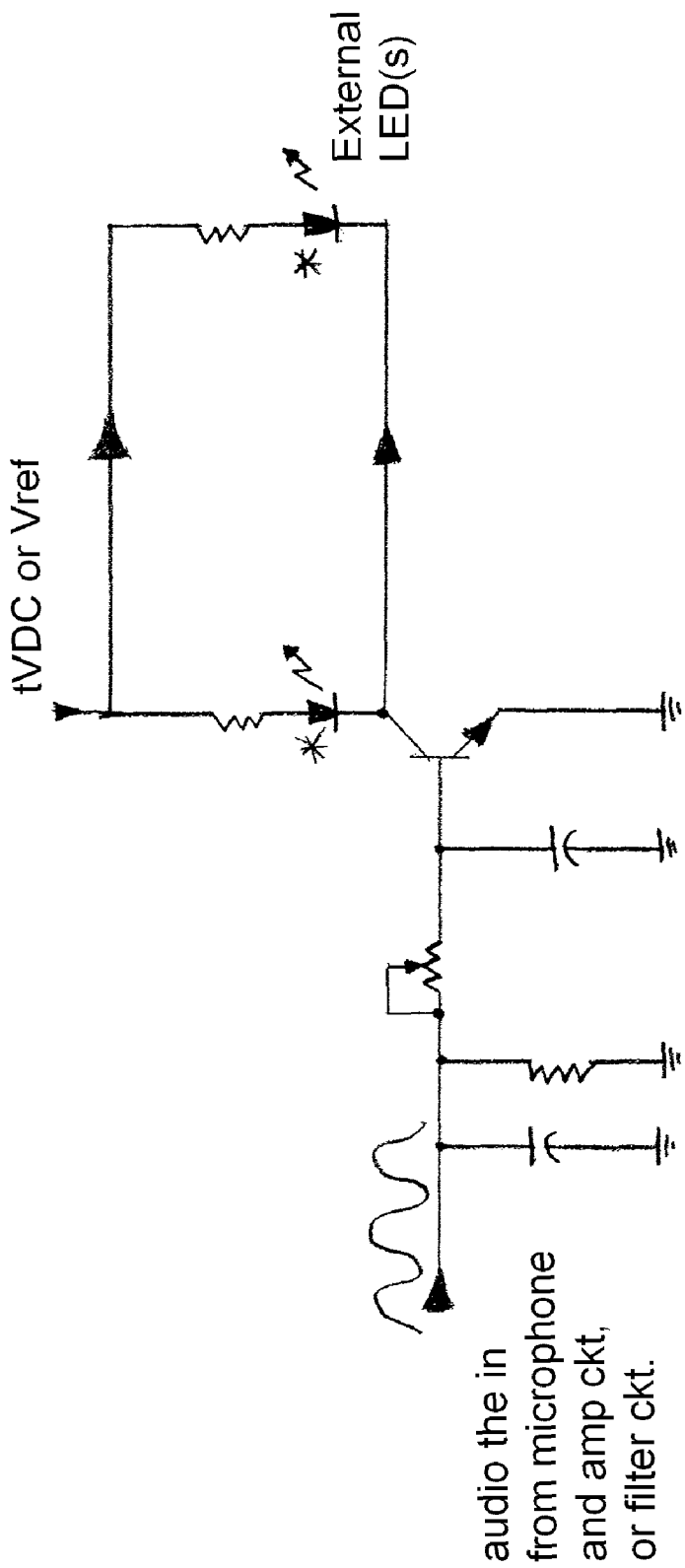
FIG. 22 is an LED control circuit for malleable LED lights of the present invention which causes LED to change color with music.
Figure 23:
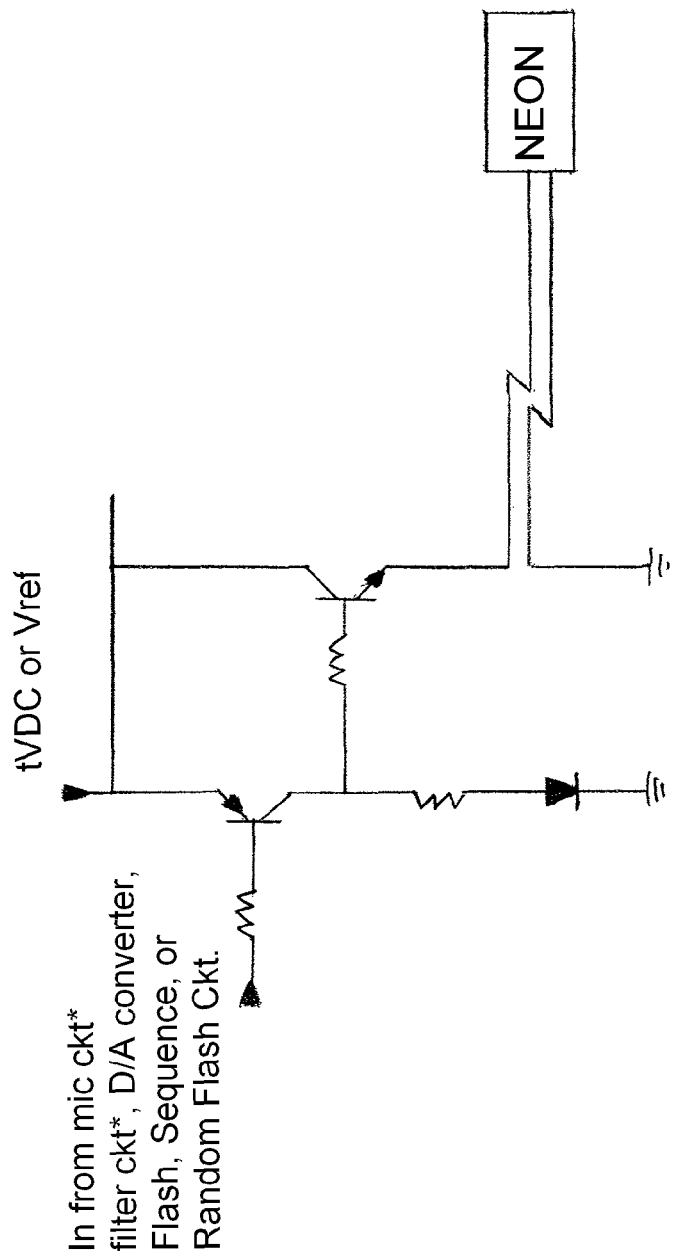
FIG. 23 is an LED control circuit with a neon/auxiliary driver circuit for malleable LED lights of the present invention.
Figure 24:
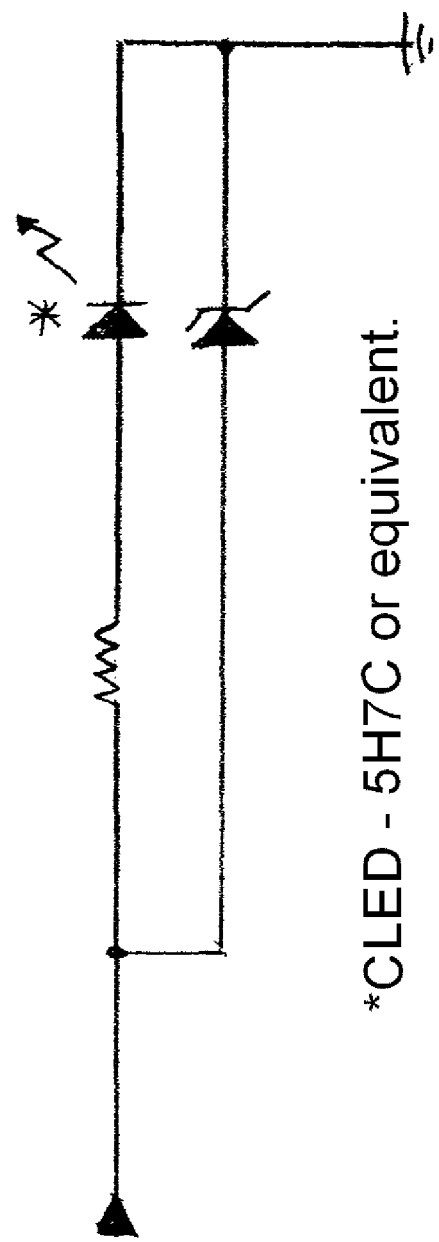
FIG. 24 is an LED control circuit for malleable LED lights of the present invention which causes LED to change color.
Figure 25:
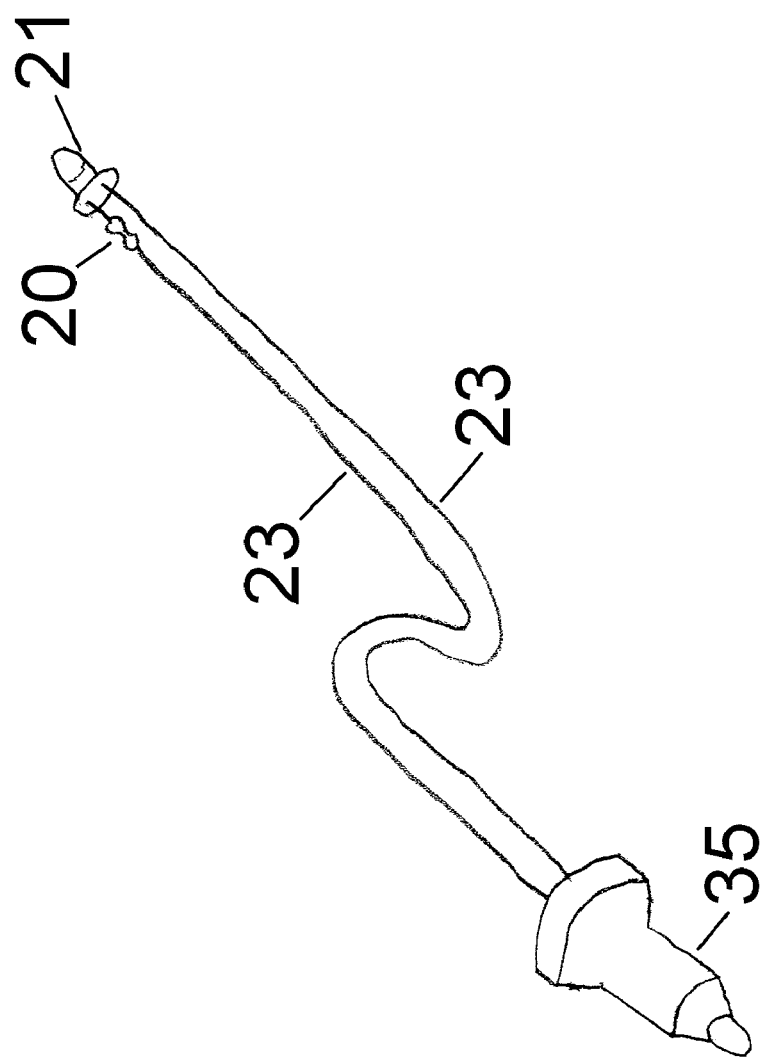
FIG. 25 shows a malleable LED light of the present invention with a connection to get power from a standard automobile cigarette lighter receptacle.

Some features of the second embodiment of the present invention can preferably include:

LED control circuit to strobe (FIG. 20);

LED control circuit to flash (FIG. 20);

LED control circuit to random flash (FIG. 21);

LED control circuit to chase (FIG. 21);

LED control circuit to pulse with music (FIGS. 18 and 10);

LED control circuit to change color with music (FIG. 22);

LED control circuit to pulse or turn on individual light outputs in sequence as the amplitude of audible signal is increased (FIG. 9);

LED control circuit adaptable to neon (FIGS. 5 and 23);

LED control circuit to change colors (FIG. 24);

LED control circuit to vary brightness manually (FIG. 19);

LED control circuit to vary brightness automatically (FIG. 20);

LED control circuit of adaptable to other LED lighting other than malleable wire light (FIGS. 23, 5, 18, and 10);

LED(s), resistors, wire, and insulation formed in small cylindrical shape the size of the LED adapted to route through tight and low clearance places (FIG. 3);

LED(s), resistors, wire, and insulation formed in small cylindrical shape the size of the LED adapted to bend in various shapes (FIG. 3);

LED(s), resistors, wire, and insulation formed in small cylindrical shape the size of the LED;

LED adapted to be weatherproof (FIG. 3);

LED(s), resistors, wire, and insulation formed in small cylindrical shape the size of the LED adapted to be vibration resistant (FIG. 3);

LED(s), resistors, wire, and insulation formed in small cylindrical shape the size of the LED adapted to last 100,000 hours of continuous operation, longer if flashing (FIG. 3);

LED(s), resistors, wire, and insulation formed in small cylindrical shape the size of the LED adapted to be very energy efficient (FIG. 3);

LED(s), resistors, wire, and insulation formed in small cylindrical shape the size of the LED adapted to create very little heat (FIG. 3);

LED(s), resistors, wire, and insulation formed in small cylindrical shape the size of the LED adapted to connect to DC power via automotive cigarette lighter (FIG. 25);

LED(s), resistors, wire, and insulation formed in small cylindrical shape the size of the LED adapted to connect to DC power via connection to fuse box or splice into any automotive power including brake, tail, turn, headlights, interior lights, dome lights, indicator lights or any other source of power including connecting directly to the battery (FIG. 3);

LED(s), resistors, wire, and insulation formed in small cylindrical shape the size of the LED adapted to create very little heat.

The present invention includes multiple LEDs of various colors in a clear lens of a tail light of an automobile.

The circuits herein could be used with a single LED (unless, by the nature of the circuit, no useful output would occur, as in the case of chasing LEDs). The circuits herein are preferably used with the malleable LED apparatus of the present invention, but could be used with other LEDs. The circuits herein are preferably used with LEDs installed in automobiles and trucks.

FIG. 25 shows a malleable LED light 20 with a connection 35 to get power from a standard automobile cigarette lighter receptacle.

More information about LEDs and LED products can be found at www.jamstrait.com.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A flashing, self-contained, display device including:

a housing for containing a power source, conductors, and an LED, the housing having a top and a bottom;

a hole in the housing to allow the housing to be placed on a store peg behind products hung on the store peg;

the LED being mounted facing forward near the top of the housing, above the products hung on the store peg, so that the LED can be viewed when products are hung on the store peg.

2. The apparatus of claim 1, further comprising circuitry to cause the LED to flash.

3. The apparatus of claim 1, wherein the power source includes batteries.

4. The apparatus of claim 1, further comprising adhesive means to attach the apparatus to a store peg mount.

5. The apparatus of claim 4, wherein the adhesive means comprises double-sided tape.

6. A flashing, self-contained, display device including:

a housing for containing a power source, conductors, and at least one LED, the housing having a top and a bottom;

a hole in the housing to allow the housing to be placed on a store peg behind products hung on the store peg;

the at least one LED being mounted facing forward near the top of the housing, above the products hung on the store peg, so that the LED can be viewed when products are hung on the store peg.

7. The apparatus of claim 6, further comprising circuitry to cause the at least one LED to flash.

8. The apparatus of claim 6, wherein the power source includes batteries.

9. The apparatus of claim 6, further comprising adhesive means to attach the apparatus to a store peg mount.

10. The apparatus of claim 9, wherein the adhesive means comprises double-sided tape.

* * * * *